(12) United States Patent
Shimosaka

(10) Patent No.: US 11,619,298 B2
(45) Date of Patent: Apr. 4, 2023

(54) CHAIN GUIDE

(71) Applicant: TSUBAKIMOTO CHAIN CO., Osaka (JP)

(72) Inventor: Koichi Shimosaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 217 days.

(21) Appl. No.: 17/136,298

(22) Filed: Dec. 29, 2020

(65) Prior Publication Data
US 2021/0285537 A1  Sep. 16, 2021

(30) Foreign Application Priority Data
Mar. 10, 2020 (JP) .............................. JP2020-040871

(51) Int. Cl.
| | |
|---|---|
| F16H 57/05 | (2006.01) |
| F16H 7/18 | (2006.01) |
| F01M 11/02 | (2006.01) |
| F16H 57/04 | (2010.01) |
| F01L 1/02 | (2006.01) |

(52) U.S. Cl.
CPC .............. F16H 57/05 (2013.01); F01L 1/022 (2013.01); F01M 11/02 (2013.01); F16H 7/18 (2013.01); F16H 57/042 (2013.01)

(58) Field of Classification Search
CPC .......... F16H 57/05; F16H 7/18; F16H 57/042; F01L 1/022; F01M 11/02
USPC .......................................................... 474/140
See application file for complete search history.

(56) References Cited

U.S. PATENT DOCUMENTS

| | | | | |
|---|---|---|---|---|
| 7,942,769 B2 * | 5/2011 | Pflug | .......................... | F16H 7/18 474/111 |
| 9,835,232 B2 * | 12/2017 | Geibel | ...................... | F16H 7/08 |
| 10,451,175 B2 * | 10/2019 | Mishima | ............. | F16H 57/0456 |

FOREIGN PATENT DOCUMENTS

| | | | | | |
|---|---|---|---|---|---|
| DE | 102004005797 | A1 * | 5/2006 | ................ | F01L 1/02 |
| DE | 102004058948 | A1 * | 6/2006 | ................ | F16H 7/18 |
| JP | 2003-329092 | A | 11/2003 | | |
| JP | 2015209924 | A * | 11/2015 | ............. | F01L 1/022 |

* cited by examiner

Primary Examiner — Gene O Crawford
Assistant Examiner — Emily R Kincaid
(74) Attorney, Agent, or Firm — WHDA, LLP (57) ABSTRACT

An object of the present invention is to provide a chain guide that can improve functional properties of a chain drive system. The chain guide of the present invention is attached to an engine block by a mounting bolt and slidably guides a running chain. The chain guide includes a mounting part provided with a shaft hole through which a mounting bolt is passed, and an oil jet passage for injecting lubricating oil, supplied to the shaft hole at a predetermined pressure, toward the chain.

3 Claims, 10 Drawing Sheets

CHAIN GUIDE

BACKGROUND OF THE INVENTION

1. Field of the Invention

The present invention relates to, for example, a chain guide provided to a chain drive system incorporated in a timing system of a car engine in order to guide a running chain.

2. Description of the Related Art

Conventionally, it is common to use a chain guide that has a guide surface slidably guiding a running chain and a main body supporting the guide surface along a chain running direction in order to stabilize the chain and keep correct tension between sprockets.

Figure 19:
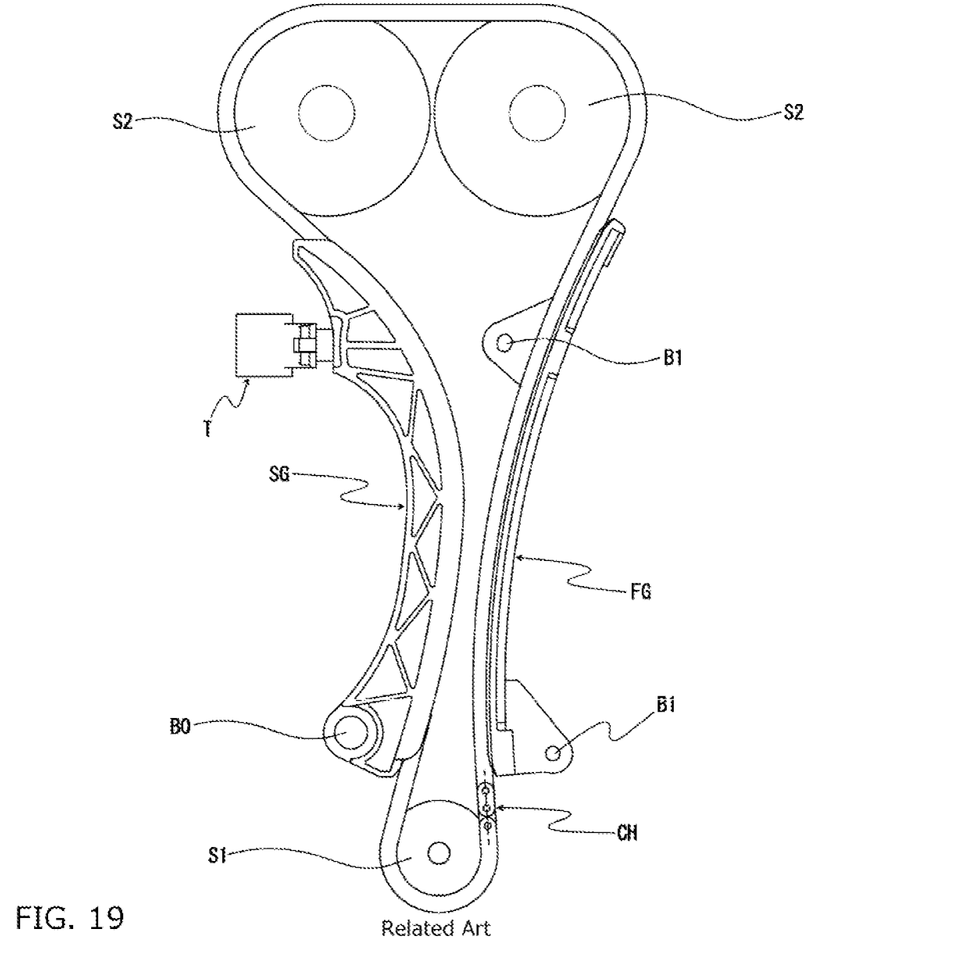
FIG. 19 is an illustrative view illustrating a schematic configuration of a conventional timing system of an engine.

For example, as illustrated in FIG. 19, a chain drive system is known that has an endless chain CH passed over a drive sprocket S1 attached to a crankshaft and a pair of driven sprockets S2 attached to cam shafts inside an engine room, with this chain CH being guided by a chain guide.

In this known chain drive system, a chain guide (movable guide) SG having a slider function is disposed on the outer side of a part of the chain CH that is the slack side, with the chain guide making sliding contact with the circulating chain CH and cooperating with a tensioner T, thereby applying appropriate tension and preventing vibration and lateral shake of the running chain. Another chain guide (fixed guide) FG is disposed on the tense side of the chain CH to prevent vibration during the running of the chain.

The movable guide SG is mounted so as to be pivotable around a pivot shaft B0 in the plane in which the chain CH is passed over, and pressed against the chain CH by the tensioner T. The fixed guide FG is secured with two mounting shafts B1.

In lubrication in the chain drive system, oil is not directly supplied to the chain, because of which deterioration in lubrication characteristics of the chain may occur. A configuration is proposed, in which a chain guide, which has been so far merely a functional component for restricting the track of the chain in a chain drive system, is configured to directly supply oil therefrom to the chain (see, for example, Japanese Patent Application Laid-open No. 2003-329092).

The chain guide described in Japanese Patent Application Laid-open No. 2003-329092 lubricates the entire contact surface between the chain and the shoe with the oil that is supplied from a hydraulic tensioner via an oil channel to an oil supply groove in the shoe and that moves along the longitudinal direction of the shoe. In this chain guide, the oil supply groove is provided along the longitudinal direction in the surface of the shoe that makes contact with the chain. A chain guide main body is integrally formed with the shoe on the back side thereof, and this chain guide main body is provided with the oil channel that brings an oil passage, formed inside a piston of the hydraulic tensioner, into direct liquid communication with the oil supply groove of the shoe.

SUMMARY OF THE INVENTION

Even with the chain guide described in Japanese Patent Application Laid-open No. 2003-329092, it is difficult to improve functional properties required of the chain drive system, such as chain wear resistance, wear resistance of the chain running surface, friction properties and noise performance (low noise characteristics) of the timing system, and so on. With regard to movable guides, it is also difficult to improve functional properties such as wear resistance of a mounting part where the pivot shaft is passed through, sliding properties of the pivot shaft and the mounting part, and so on.

The present invention has been made on the basis of the circumstances described above, and it is an object of the invention is to provide a chain guide that can improve functional properties of a chain drive system.

The chain guide according to the present invention solves the above problem by providing a chain guide attached to an engine block by a mounting bolt and slidably guiding a running chain and including a mounting part provided with a shaft hole through which the mounting bolt is passed, and an oil jet passage for injecting lubricating oil, supplied to the shaft hole at a predetermined pressure, toward the chain.

According to the chain drive system set forth in a first aspect of this application, the lubrication efficiency is improved because lubricating oil is injected to and directly supplied to the chain, which leads to improved functional properties of the chain drive system.

Namely, the wear resistance of the chain can be improved, and chain elongation can be inhibited. The sliding resistance between the chain and the chain running surface is significantly lowered, and also an increase over time in the sliding resistance is suppressed, whereby the wear on the chain running surface can be reduced. Moreover, the smooth sliding contact between the chain and the chain guide can reduce friction loss, thereby improving the fuel economy of an engine, as well as improving the noise performance of the chain drive system, as the friction noise caused by the sliding contact is reduced.

In a case where the chain guide is configured as a movable guide pivotable around a mounting bolt serving as the pivot shaft so as to apply appropriate tension to the chain cooperating with a tensioner, excellent sliding properties are achieved for the mounting bolt in the mounting part, whereby wear resistance can be improved.

In addition, by forming the oil jet passage to be oriented from the mounting part toward the chain, the oil jet passage with a minimum length can be formed, which helps to reduce the amount of necessary oil, and ensures stable supply of lubricating oil to the chain.

According to the configuration set forth in a second aspect of this application, lubricating oil supplied from the engine block can be reliably guided into the shaft hole in the mounting part.

According to the configuration set forth in a third aspect of this application, lubricating oil can be reliably guided into the shaft hole in the mounting part even when the chain guide is configured as a movable guide.

According to the configuration set forth in a fourth aspect of this application, a processing load required for the engine block can be reduced, because only an oil supply port needs to be provided to a bolt mounting hole in the engine block.

According to the configuration set forth in a fifth aspect of this application, wherever an oil release port is located in the circumferential direction of the mounting bolt, the lubricating oil supplied to the mounting part can be reliably guided into the oil jet hole.

DESCRIPTION OF THE PREFERRED EMBODIMENTS

The present invention may be embodied in any way insofar as a chain guide is provided, which chain guide is attached to an engine block with a mounting bolt to slidably guide a running chain, and includes a mounting part provided with a shaft hole for the mounting bolt to be passed through, and an oil jet passage for injecting lubricating oil supplied to the shaft hole at a predetermined pressure toward the chain.

The chain guide of the present invention may be configured as a fixed guide that is fixedly attached to an engine block to slidably guide the chain, or as a movable guide (tensioner lever) pivotably supported inside the engine room such as to apply appropriate tension to the chain, cooperating with a hydraulic tensioner.

The chain running surface (sliding surface) of the chain guide may be integrally formed with the chain guide from a material having favorable sliding properties, or, a guide shoe that allows favorable sliding of the chain may be removably attached to the chain guide.

The chain guide of the present invention may be made of any material that has low friction resistance against the chain. Specifically, materials that can exhibit durability and allow the chain to run smoothly in sliding contact in high-temperature environments are preferable. Examples of such material include synthetic resin materials such as polyamide 6 resin, polyamide 46 resin, polyamide 66 resin, polyacetal resin, and so on.

Embodiment 1

The chain guide 100 according to a first embodiment of the present invention is configured as a movable guide, attached to an engine block (not shown) such as to be pivotable around a mounting bolt 140 as the pivot shaft and to apply appropriate tension to a chain, cooperating with a hydraulic tensioner (not shown) as illustrated in FIG. 1 to FIG. 4.

This chain guide 100 has a shoe 110 slidably guiding a running chain, and a base member 115 supporting the shoe 110 along a longitudinal guiding direction (chain running direction). The shoe 110 and base member 115 are made of a synthetic resin material or the like.

The shoe 110 has a chain running surface (sliding surface) 111 extending along the longitudinal guiding direction, and guide parts 112 standing upright along both edges of the chain running surface 111 in the guide width direction.

The base member 115 is curved along the longitudinal guiding direction, and has a mounting part 120 near one end of the longitudinal guiding direction for attaching the chain guide to the engine block, and a tensioner abutment part 128 near the other end for making contact with the hydraulic tensioner.

The mounting part 120 is provided with a shaft hole 121 forming a columnar space for the mounting bolt 140 to be passed through.

The mounting bolt 140 for attaching the chain guide 100 to the engine block is a flange bolt composed of a head 141, a disc-like flange 142 continuous with the head 141, a columnar shaft part 143 extending from the flange 142, and a thread part 144 radially reduced from the shaft part 143.

The chain guide 100 according to this embodiment includes an oil inlet passage 125 provided in an attachment surface 116 to be attached to the engine block for communicating an oil supply port of the engine block with the shaft hole 121 of the mounting part 120, and an oil jet passage 130 for injecting lubricating oil supplied from the engine to the shaft hole 121 via the oil inlet passage 125 at a predetermined pressure toward the chain.

Figure 1:
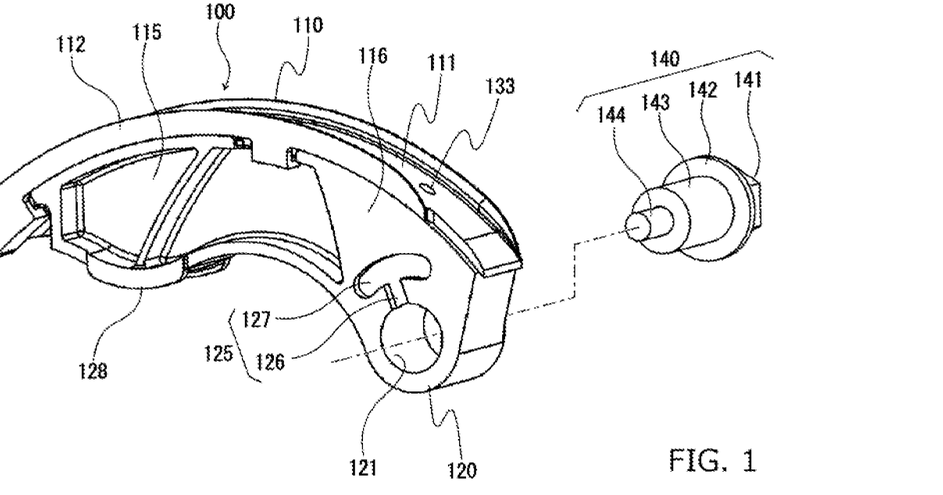
FIG. 1 is a perspective view illustrating a configuration example of a chain guide according to a first embodiment, with a mounting bolt.
Figure 2:
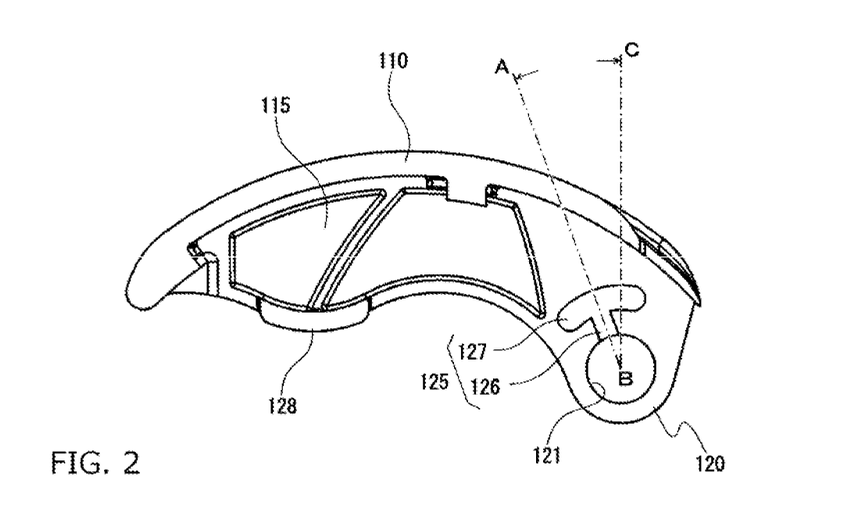
FIG. 2 is a plan view of the chain guide illustrated in FIG. 1 viewed from a side attached to an engine block.
Figure 3:
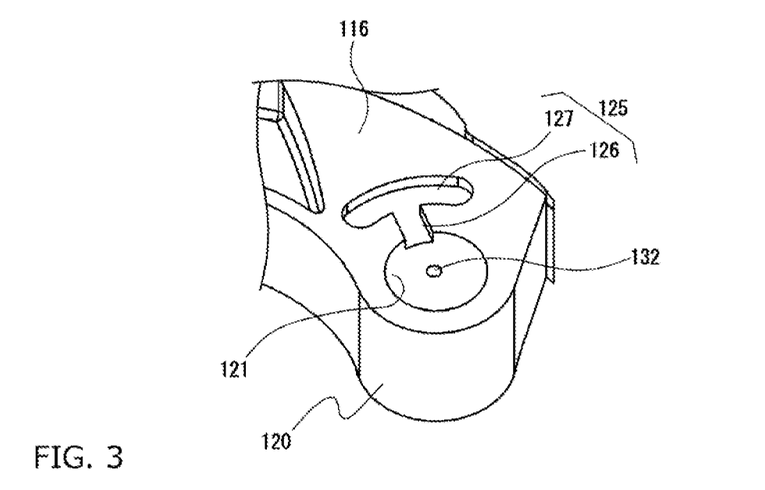
FIG. 3 is an enlarged perspective view illustrating a configuration of a mounting part of the chain guide illustrated in FIG. 1.

The oil inlet passage 125 is formed by a groove 126 linearly extending from an open edge of the shaft hole 121 radially outward, and includes an oil collecting groove 127 formed at the end that is opposite the oil supply port of the engine block to extend along a circular arc around the pivot shaft as the center.

Figure 4:
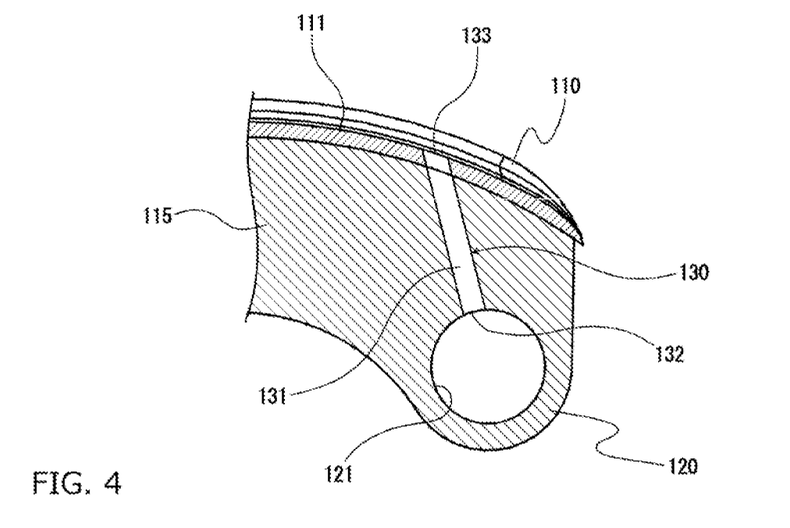
FIG. 4 is a schematic view of a cross section of the chain guide illustrated in FIG. 1 cut in a plane vertical to a pivot shaft at a point where an oil jet hole is formed.

The oil jet passage 130 is formed by an oil jet hole 131 linearly extending between an oil inlet port 132 opened in an inner surface of the shaft hole 121 and an oil outlet port 133 opened in the chain running surface 111.

The oil jet hole 131 is inclined toward the upstream of the chain running direction to ensure lubrication of the chain.

In this embodiment, the oil inlet port 132 is positioned in the middle in the axial direction of the shaft hole 121 and within the circumferential width range of the oil inlet passage 125 in the circumferential direction of the shaft hole 121. The oil outlet port 133 is positioned in the middle in the guide width direction at one end in the longitudinal guiding direction of the chain running surface 111. As long as the oil jet hole 131 is formed as described above, the positions of the oil inlet port 132 and the oil outlet port 133 are not limited. Preferably, the ports should be formed such as to minimize the length of the oil jet passage 130.

Figure 5:
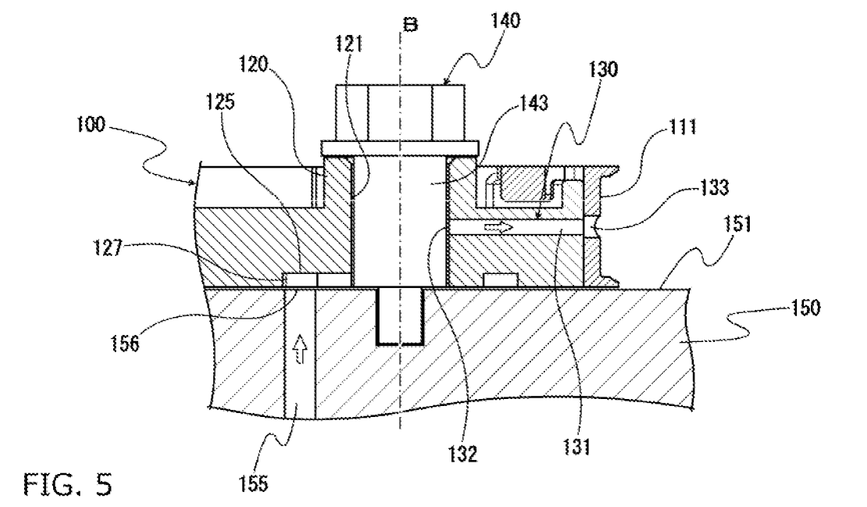
FIG. 5 is a combined cross-sectional view along lines A-B-C of FIG. 2 illustrating the chain guide shown in FIG. 1 when attached to an engine block.

In the chain guide 100 according to this embodiment, engine oil is supplied as lubricating oil to the oil inlet passage 125 at a predetermined supply pressure from an oil supply passage 155, which has an oil supply port 156 opening in a chain guide attachment surface 151 of the engine block 150, as illustrated in FIG. 5. The oil collecting groove 127 positioned at the end of the oil inlet passage 125 opposite the oil supply port 156 of the engine block 150 ensures that lubricating oil is reliably introduced from the oil collecting groove 127 into the oil inlet passage 125 even when the chain guide 100 rocks for the adjustment of tension of the running chain.

The lubricating oil introduced into the oil inlet passage 125 flows in between the inner circumference of the shaft hole 121 of the mounting part 120 and the outer circumference of the shaft part 143 of the mounting bolt 140, and lubricates sliding parts between the mounting bolt 140 serving as the pivot shaft and the shaft hole 121. The lubricating oil inside the shaft hole 121 further flows into the oil jet hole 131 from the oil inlet port 132. The lubricating oil that has entered the oil jet hole 131 is injected from the oil outlet port 133 opened in the chain running surface 111 toward the running chain, and lubricates the chain directly, as well as lubricates the chain running surface 111.

Embodiment 2

The chain guide according to a second embodiment of the present invention has substantially the same configuration as the chain guide 100 according to the first embodiment described above except for a difference in the configuration of the oil jet passage. The chain guide according to this embodiment is configured as a movable guide, attached to an engine block such as to be pivotable by a mounting bolt to apply appropriate tension to a chain, cooperating with a hydraulic tensioner. This chain guide 200 has a shoe 110 slidably guiding a running chain, and a base member 215 supporting the shoe 110 along a longitudinal guiding direction (chain running direction), as illustrated in FIG. 6 to FIG. 9.

Figure 6:
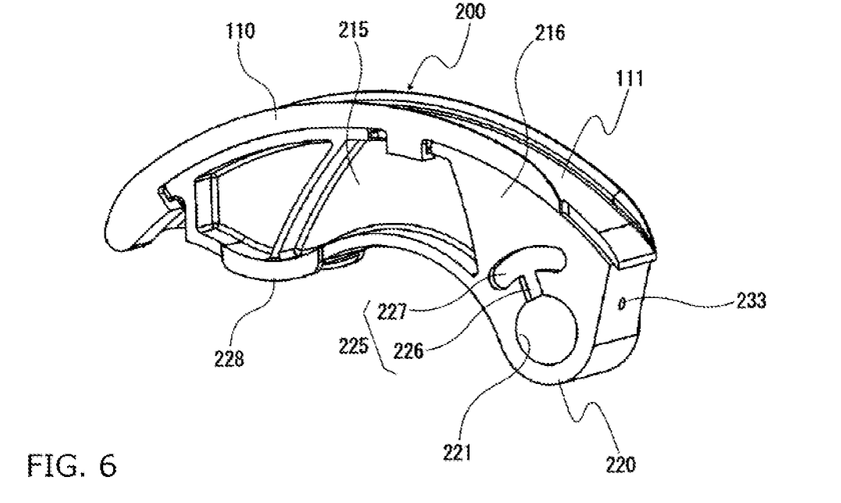
FIG. 6 is a perspective view illustrating a configuration example of a chain guide according to a second embodiment.
Figure 7:
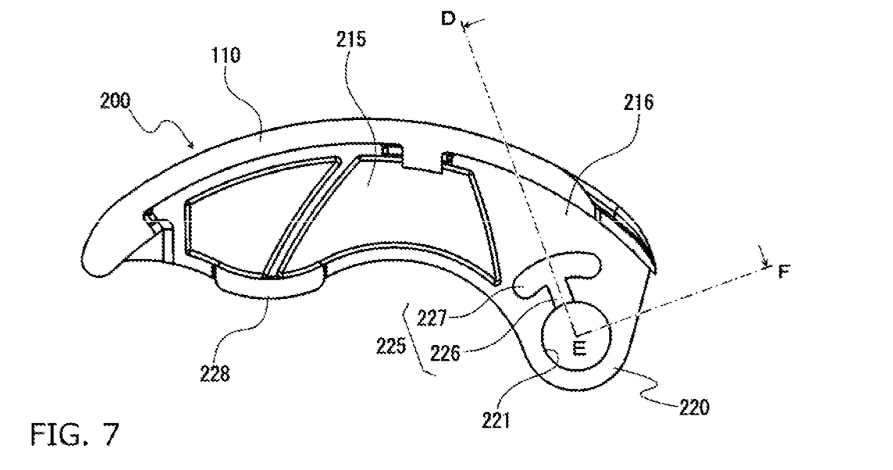
FIG. 7 is a plan view of the chain guide illustrated in FIG. 6 viewed from a side attached to an engine block.
Figure 8:
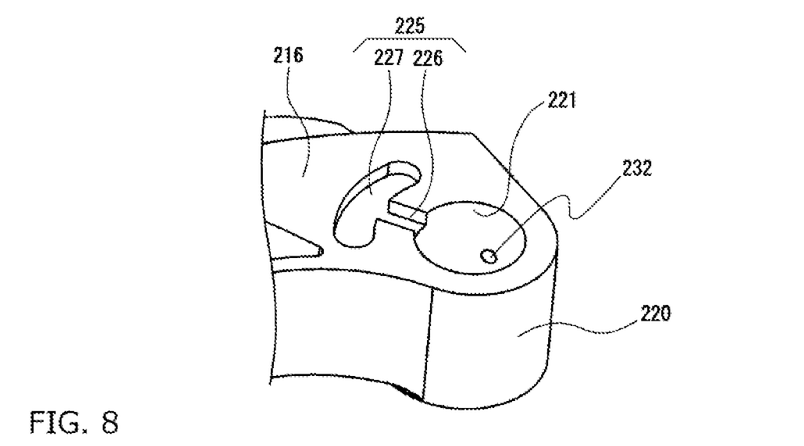
FIG. 8 is an enlarged perspective view illustrating a configuration of a mounting part of the chain guide illustrated in FIG. 6.

The base member 215 is curved along the longitudinal guiding direction, and has a mounting part 220 near one end of the longitudinal guiding direction for attaching the chain guide to the engine block, and a tensioner abutment part 228 near the other end for making contact with the hydraulic tensioner. The mounting part 220 is provided with a shaft hole 221 forming a columnar space for the mounting bolt to be passed through.

An attachment surface 216 to be attached to the engine block includes an oil inlet passage 225, which is formed by a groove 226 linearly extending from an open edge of the shaft hole 221 radially outward, and an oil collecting groove 227 extending along a circular arc around the pivot shaft as the center.

Figure 9:
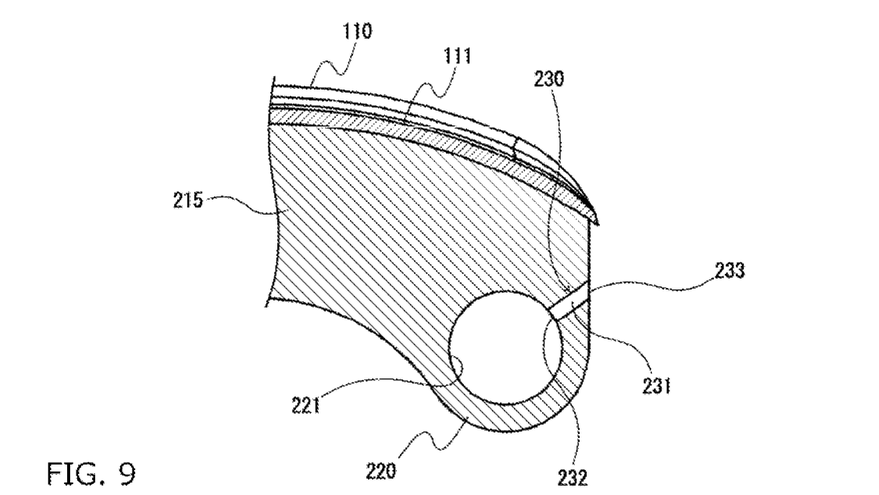
FIG. 9 is a schematic view of a cross section of the chain guide illustrated in FIG. 6 cut in a plane vertical to a pivot shaft at a point where an oil jet hole is formed.

The oil jet passage 230 in the chain guide 200 according to the second embodiment is formed by an oil jet hole 231 linearly extending between an oil inlet port 232 opened in an inner surface of the shaft hole 221 of the mounting part 220 and an oil outlet port 233 opened in an end face at one end in the longitudinal guide direction of the base member 215, as illustrated in FIG. 9. The oil jet hole 231 is inclined toward the upstream of the chain running direction. Similarly to the chain guide 100 according to the first embodiment, as long as the oil jet hole 231 is formed as described above, the positions of the oil inlet port 232 and the oil outlet port 233 are not limited. Preferably, the ports should be formed such as to minimize the length of the oil jet passage 230.

Figure 10:
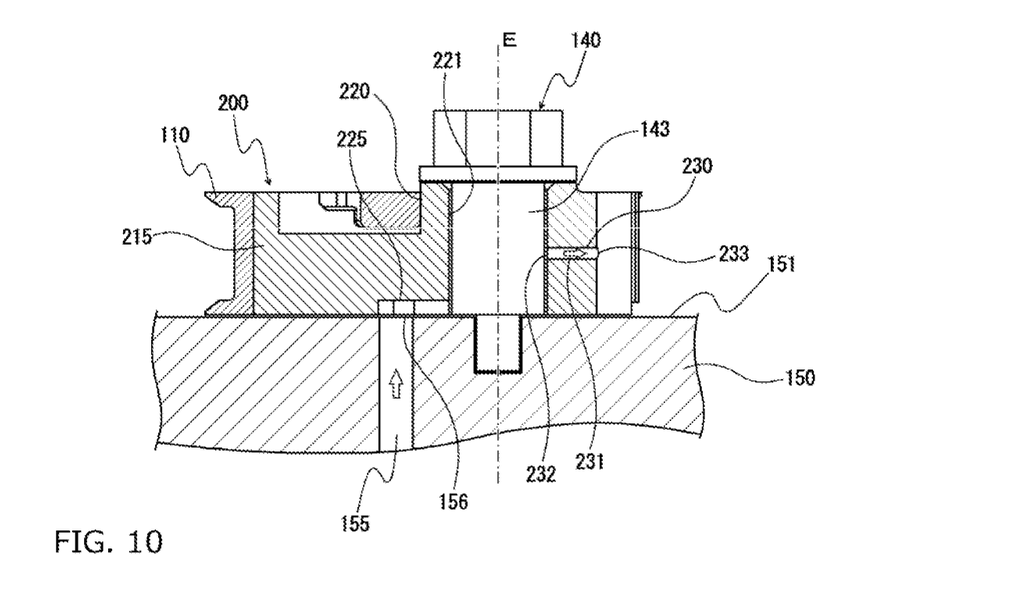
FIG. 10 is a combined cross-sectional view along lines D-E-F of FIG. 7 illustrating the chain guide shown in FIG. 6 when attached to an engine block.

In the chain guide 200 according to this embodiment, engine oil is supplied as lubricating oil to the oil inlet passage 225 at a predetermined supply pressure from an oil supply passage 155, which has an oil supply port 156 opening in a chain guide attachment surface 151 of the engine block 150, as illustrated in FIG. 10. The lubricating oil introduced into the oil inlet passage 225 flows in between the inner circumference of the shaft hole 221 of the mounting part 220 and the outer circumference of the shaft part 143 of the mounting bolt 140, and lubricates sliding parts between the mounting bolt 140 serving as the pivot shaft and the shaft hole 221. The lubricating oil inside the shaft hole 221 further flows into the oil jet hole 231 from the oil inlet port 232. The lubricating oil that has entered the oil jet hole 231 is injected from the oil outlet port 233 opened in the end face at one end in the longitudinal guide direction of the base member 215 toward the running chain, and lubricates the chain directly. The chain running surface 111 is also lubricated by the chain supplied with the lubricating oil making sliding contact with the chain running surface 111.

Embodiment 3

Figure 11:
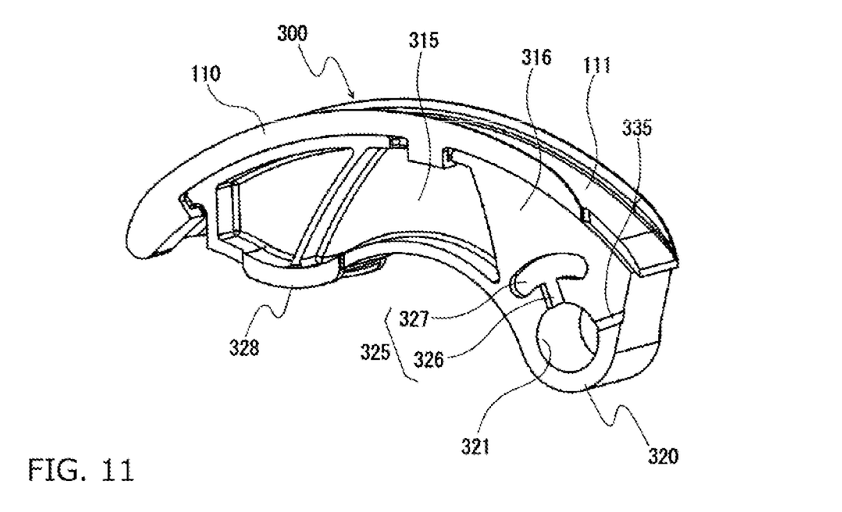
FIG. 11 is a perspective view illustrating a configuration example of a chain guide according to a third embodiment.
Figure 12:
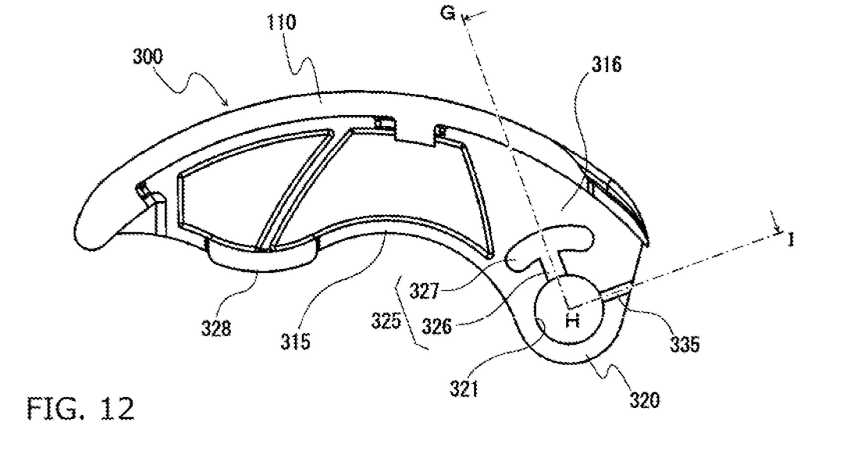
FIG. 12 is a plan view of the chain guide illustrated in FIG. 11 viewed from a side attached to an engine block.

The chain guide according to a third embodiment of the present invention has substantially the same configuration as the chain guide 100 according to the first embodiment described above except for a difference in the configuration of the oil jet passage. The chain guide according to this embodiment is configured as a movable guide, attached to an engine block such as to be pivotable by a mounting bolt to apply appropriate tension to a chain, cooperating with a hydraulic tensioner. This chain guide 300 has a shoe 110 slidably guiding a running chain, and a base member 315 supporting the shoe 110 along a longitudinal guiding direction (chain running direction), as illustrated in FIG. 11 and FIG. 12.

The base member 315 is curved along the longitudinal guiding direction, and has a mounting part 320 near one end of the longitudinal guiding direction for attaching the chain guide to the engine block, and a tensioner abutment part 328 near the other end for making contact with the hydraulic tensioner. The mounting part 320 is provided with a shaft hole 321 forming a columnar space for the mounting bolt to be passed through.

An attachment surface 316 to be attached to the engine block includes an oil inlet passage 325, which is formed by a groove 326 linearly extending from an open edge of the shaft hole 321 radially outward, and an oil collecting groove 327 extending along a circular arc around the pivot shaft as the center.

The chain guide 300 according to the third embodiment includes a groove-like oil jet channel 335 provided in the attachment surface 316 of the base member 315 to be attached to the engine block, and extending linearly from an open edge of the shaft hole 321 toward one end in the longitudinal guide direction of the base member 315. When the chain guide 300 is attached to the engine block so that the oil jet channel 335 is closed by a wall of the engine block, an oil jet passage 330 is formed, which has an oil inlet port 332 opened in an inner surface of the shaft hole 321 and an oil outlet port 333 opened in an end face at one end in the longitudinal guide direction of the base member 315 (see FIG. 13). The oil jet channel 335 is inclined toward the upstream of the chain running direction. Similarly to the chain guide 100 according to the first embodiment, as long as the oil jet passage 330 is formed as described above, the positions of the oil inlet port 332 and the oil outlet port 333 are not limited. Preferably, the ports should be formed such as to minimize the length of the oil jet passage 330.

Figure 13:
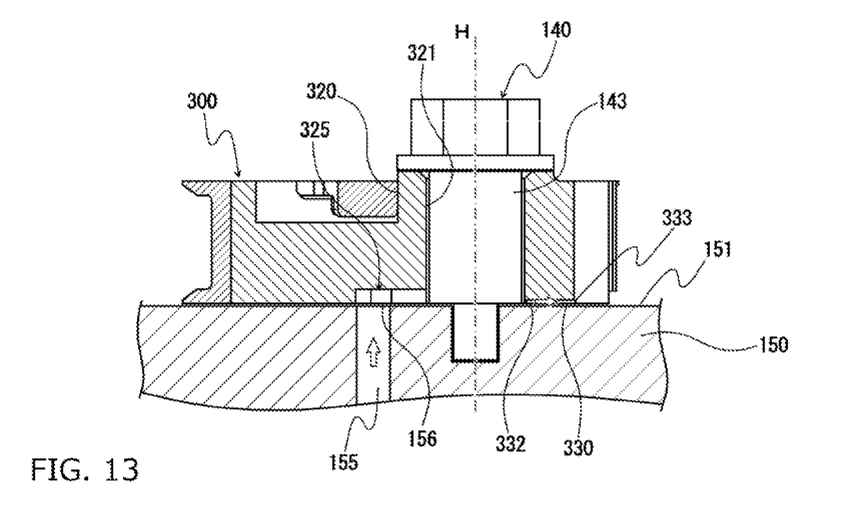
FIG. 13 is a combined cross-sectional view along lines G-H-I of FIG. 12 illustrating the chain guide shown in FIG. 11 when attached to an engine block.

In the chain guide 300 according to this embodiment, engine oil is supplied as lubricating oil to the oil inlet passage 325 at a predetermined supply pressure from an oil supply passage 155, which has an oil supply port 156 opening in a chain guide attachment surface 151 of the engine block 150, as illustrated in FIG. 13. The lubricating oil introduced into the oil inlet passage 325 flows in between the inner circumference of the shaft hole 321 of the mounting part 320 and the outer circumference of the shaft part 143 of the mounting bolt 140, and lubricates sliding parts between the mounting bolt 140 serving as the pivot shaft and the shaft hole 321, after which the oil flows into the oil jet passage 330 formed by the oil jet channel 335 and the engine block 150. The lubricating oil that has entered the oil jet passage 330 is injected from the oil outlet port 333 opened in the end face at one end in the longitudinal guide direction of the base member 315 toward the running chain, and lubricates the chain directly. The chain running surface 111 is also lubricated by the chain supplied with the lubricating oil making sliding contact with the chain running surface.

Embodiment 4

Figure 14:
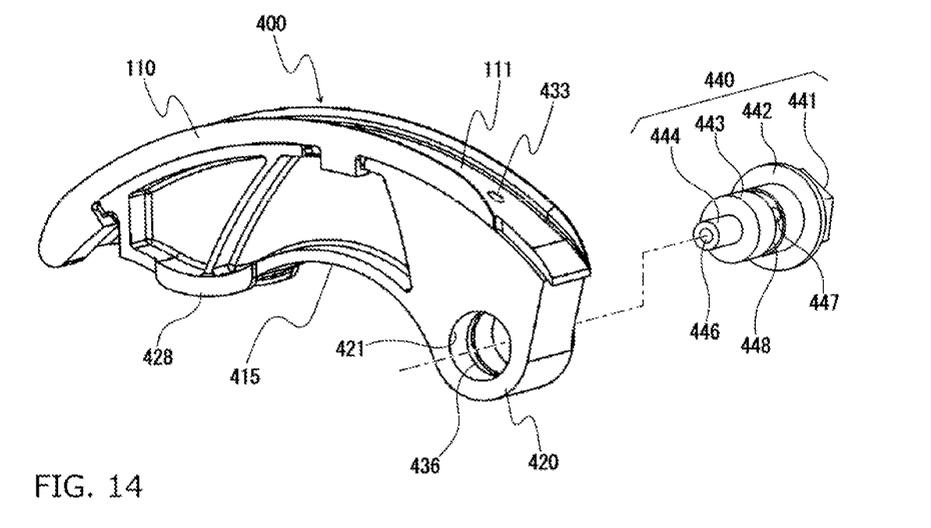
FIG. 14 is a perspective view illustrating a configuration example of a chain guide according to a fourth embodiment, with a mounting bolt.
Figure 15:
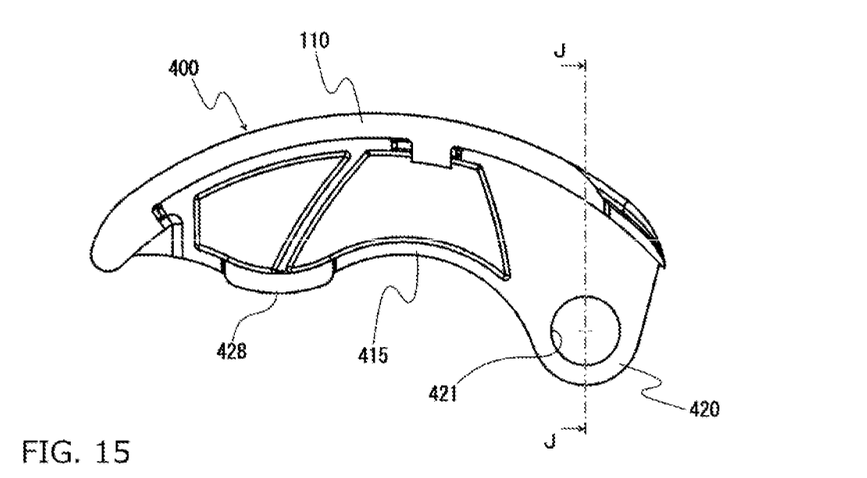
FIG. 15 is a plan view of the chain guide illustrated in FIG. 14 viewed from a side attached to an engine block.
Figure 16:
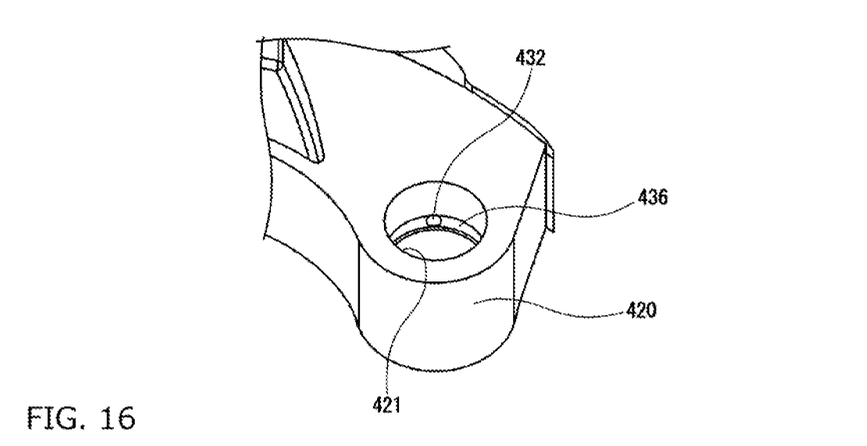
FIG. 16 is an enlarged perspective view illustrating a configuration of a mounting part of the chain guide illustrated in FIG. 14.

The chain guide according to a fourth embodiment of the present invention has substantially the same configuration as the chain guide 100 according to the first embodiment described above except for a difference in the configuration for supplying oil to the shaft hole. The chain guide according to this embodiment is configured as a movable guide, attached to an engine block (not shown) such as to be pivotable by a mounting bolt to apply appropriate tension to a chain, cooperating with a hydraulic tensioner (not shown). This chain guide 400 has a shoe 110 slidably guiding a running chain, and a base member 415 supporting the shoe 110 along a longitudinal guiding direction (chain running direction), as illustrated in FIG. 14 to FIG. 16.

The base member 415 is curved along the longitudinal guiding direction, and has a mounting part 420 near one end of the longitudinal guiding direction for attaching the chain guide to the engine block, and a tensioner abutment part 428 near the other end for making contact with the hydraulic tensioner. The mounting part 420 is provided with a shaft hole 421 forming a columnar space for the mounting bolt 440 to be passed through.

Figure 18:
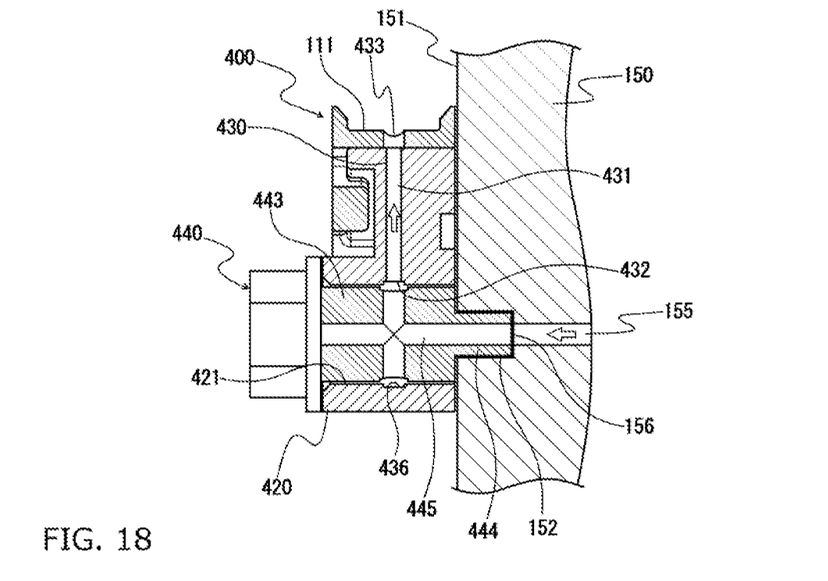
FIG. 18 is a cross-sectional view along line J-J of FIG. 15 illustrating the chain guide shown in FIG. 14 when attached to an engine block.

The oil jet passage 430 in the chain guide 400 according to this embodiment is formed by an oil jet hole 431 linearly extending between an oil inlet port 432 opened in an inner surface of the shaft hole 421 and an oil outlet port 433 opened in the chain running surface 111 (see FIG. 18). The oil inlet port 432 and oil outlet port 433 are formed at the same positions as those of the chain guide 100 according to the first embodiment, and the oil jet hole 431 is inclined toward the upstream of the chain running direction.

A circumferential groove 436 is formed in the inner surface of the shaft hole 421 of the mounting part 420 where the oil inlet port 432 of the oil jet hole 431 opens. This configuration allows for stable introduction of the lubricating oil into the oil jet hole 431 by guiding the lubricating oil supplied to the shaft hole 421 into the oil jet hole 431 wherever an oil release port, to be described later, of the mounting bolt 440 is located in the circumferential direction.

The chain guide 400 according to the fourth embodiment has an oil supply structure designed to supply oil from the engine via an oil passage provided to the mounting bolt 440 to the shaft hole 421 of the mounting part 420 of the base member 415.

Figure 17:
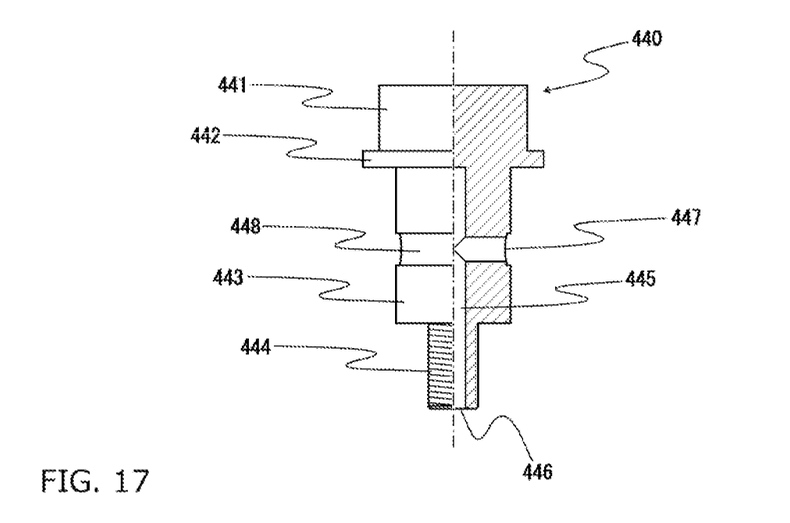
FIG. 17 is a one-side sectional view along an axial direction illustrating a configuration example of a mounting bolt for attaching the chain guide according to the fourth embodiment to the engine block.

The mounting bolt 440 for attaching the chain guide 400 according to this embodiment to the engine block is a flange bolt, as also illustrated in FIG. 17, composed of a head 441, a disc-like flange 442 continuous with the head 441, a columnar shaft part 443 extending from the flange 442, and a thread part 444 radially reduced from the shaft part 443.

This mounting bolt 440 has an oil passage 445, formed to have an oil inlet port 446 opened at the distal end in the axial direction of the mounting bolt 440 and an oil release port 447 opened in a side face of the shaft part 443.

The oil release port 447 is located at an axial position opposite the point where the oil inlet port 432 of the oil jet hole 431 opens, with the mounting bolt 440 passed through the shaft hole 421 of the chain guide 400.

A circumferential groove 448 is formed in the side face of the shaft part 443 where the oil release port 447 opens. This configuration allows for stable introduction of the lubricating oil into the oil jet hole 431 by guiding the lubricating oil supplied to the shaft hole 421 into the oil jet hole 431 wherever the oil release port 447 is located in the circumferential direction.

While circumferential grooves 436 and 448 are respectively formed to the inner face of the shaft hole 421 of the chain guide 400 and the side face of the mounting bolt 440 in this embodiment, a circumferential groove need only be provided to at least one of the inner face of the shaft hole 421 of the chain guide 400 and the side face of the mounting bolt 440.

In the chain guide 400 according to this embodiment, engine oil is supplied as lubricating oil to the oil passage 445 of the mounting bolt 440 at a predetermined supply pressure from an oil supply passage 155, which has an oil supply port 156 opening inside a bolt mounting hole 152 of the engine block 150, in which the thread part 444 of the mounting bolt 440 is engaged, as illustrated in FIG. 18.

The lubricating oil supplied into the oil passage 445 is released to between the inner circumference of the shaft hole 421 of the mounting part 420 and the outer circumference of the shaft part 443 of the mounting bolt 440, and lubricates sliding parts between the mounting bolt 440 serving as the pivot shaft and the shaft hole 421. The lubricating oil inside the shaft hole 421 further flows into the oil jet hole 431 from the oil inlet port 432. The lubricating oil that has entered the oil jet hole 431 is injected from the oil outlet port 433 opened in the chain running surface 111 toward the running chain, and lubricates the chain directly, as well as lubricates the chain running surface 111.

While embodiments of the present invention have been described above in detail, the present invention is not limited to the embodiments described above. Various design changes may be made without departing from the scope of the claims set forth in the claims.

For example, various features of the embodiments described above may be combined as desired to configure other chain guides.

Instead of attaching the chain guide to the engine block with a mounting bolt as described in the embodiments, the chain guide may be mounted by fitting a pivot shaft protruding from an attachment surface of the engine block or the like into the shaft hole of the mounting part.

Moreover, instead of supplying lubricating oil from the engine as described above, the chain guide, in the case where it is designed as a movable chain guide, may be configured such as to receive lubricating oil in the shaft hole of the mounting part from the hydraulic tensioner. Such a chain guide would only need an oil passage leading from a part abutting the tensioner to the shaft hole of the mounting part. It is also possible to configure the chain guide such that lubricating oil is supplied from both the engine and the hydraulic tensioner

What is claimed is:

1. A chain guide attached to an engine block by a mounting bolt and slidably guiding a running chain, the chain guide comprising:
    a mounting part provided with a shaft hole through which the mounting bolt is passed;
    an oil jet passage for injecting lubricating oil, supplied to the shaft hole at a predetermined pressure, toward the chain; and
    in an attachment surface that is to be attached to the engine block, an oil inlet passage for making an oil supply port of the engine block and the shaft hole communicate with each other, wherein
    the chain guide is configured to be pivotable around the mounting bolt serving as a pivot shaft, and
    the oil inlet passage includes an oil collecting groove at a position opposite the oil supply port of the engine block, the oil collecting groove being formed to extend along a circular arc, with the pivot shaft being a center thereof.

2. The chain guide according to claim 1, wherein
    the mounting bolt includes an oil passage making the oil supply port of the engine block and the shaft hole communicate with each other,
    the oil passage is configured to have an oil inlet port opened at a distal end in an axial direction of the mounting bolt and an oil release port opened in a side face of a shaft part of the mounting bolt.

3. The chain guide according to claim 1, wherein the oil jet passage is formed by an oil jet hole having an oil inlet port opened in an inner surface of the shaft hole, and a circumferential groove is formed to at least one of an inner face of the shaft hole and a side face of the mounting bolt, at a position where the oil inlet port of the oil jet hole opens.

* * * * *